US008547379B2

(12) United States Patent
Pacheco et al.

(10) Patent No.: US 8,547,379 B2
(45) Date of Patent: Oct. 1, 2013

(54) SYSTEMS, METHODS, AND MEDIA FOR GENERATING MULTIDIMENSIONAL HEAT MAPS

(75) Inventors: David Pacheco, San Francisco, CA (US); Brendan Gregg, Walnut Creek, CA (US); Bryan Cantrill, Piedmont, CA (US)

(73) Assignee: Joyent, Inc., San Francisco, CA (US)

( * ) Notice: Subject to any disclaimer, the term of this patent is extended or adjusted under 35 U.S.C. 154(b) by 0 days.

(21) Appl. No.: 13/340,488

(22) Filed: Dec. 29, 2011

(65) Prior Publication Data
US 2013/0169666 A1 Jul. 4, 2013

(51) Int. Cl.
*G06T 11/20* (2006.01)
(52) U.S. Cl.
USPC .......................................................... 345/440
(58) Field of Classification Search
USPC .......................................................... 345/440
See application file for complete search history.

(56) References Cited

U.S. PATENT DOCUMENTS

| 7,222,345 | B2 | 5/2007 | Gray et al. | |
| 7,265,754 | B2 * | 9/2007 | Brauss | 345/440 |
| 7,379,994 | B2 | 5/2008 | Collazo | |
| 7,437,730 | B2 | 10/2008 | Goyal | |
| 7,640,547 | B2 | 12/2009 | Neiman et al. | |
| 7,774,457 | B1 | 8/2010 | Talwar et al. | |
| 7,904,540 | B2 | 3/2011 | Hadad et al. | |
| 7,917,599 | B1 | 3/2011 | Gopalan et al. | |
| 7,940,271 | B2 * | 5/2011 | Wright et al. | 345/440 |
| 8,141,090 | B1 | 3/2012 | Graupner et al. | |
| 8,301,746 | B2 | 10/2012 | Head et al. | |
| 8,429,282 | B1 | 4/2013 | Ahuja et al. | |
| 2002/0082856 | A1 | 6/2002 | Gray et al. | |
| 2002/0198995 | A1 | 12/2002 | Liu et al. | |
| 2003/0154112 | A1 | 8/2003 | Neiman et al. | |
| 2005/0108712 | A1 | 5/2005 | Goyal | |
| 2005/0188075 | A1 | 8/2005 | Dias et al. | |
| 2006/0107087 | A1 | 5/2006 | Sieroka et al. | |
| 2006/0153174 | A1 | 7/2006 | Towns-von Stauber et al. | |
| 2006/0218285 | A1 | 9/2006 | Talwar et al. | |
| 2007/0088703 | A1 | 4/2007 | Kasiolas et al. | |
| 2007/0118653 | A1 | 5/2007 | Bindal | |
| 2007/0250838 | A1 | 10/2007 | Belady et al. | |
| 2007/0271570 | A1 | 11/2007 | Brown et al. | |

(Continued)

FOREIGN PATENT DOCUMENTS

WO 2011088224 7/2011

OTHER PUBLICATIONS

Brendan Gregg; "Visualizing System Latency"; May 1, 2010; ACM Queue; pp. 1-13; http://queue.acm.org/detail.cfm?id=1809426.*

(Continued)

*Primary Examiner* — Said Broome
*Assistant Examiner* — Peter Hoang
(74) *Attorney, Agent, or Firm* — Carr & Ferrell LLP

(57) ABSTRACT

Systems, methods, and media for generating heat maps of event data are provided herein. Methods may include gathering instances of event data according to a performance characteristic, discretely decomposing the instances by applying at least one constraint to the instances, assigning a hue to each instance, the hue being associated with the at least one constraint, and generating a heat map that includes representations of the instances, wherein each representation includes the hue associated with the at least one constraint to which the instance has been assigned.

21 Claims, 8 Drawing Sheets
(4 of 8 Drawing Sheet(s) Filed in Color)

(56) References Cited

U.S. PATENT DOCUMENTS

| | | |
|---|---|---|
| 2008/0080396 A1 | 4/2008 | Meijer et al. |
| 2008/0103861 A1 | 5/2008 | Zhong |
| 2008/0155110 A1 | 6/2008 | Morris |
| 2009/0077235 A1 | 3/2009 | Podila |
| 2009/0164990 A1 | 6/2009 | Ben-Yehuda et al. |
| 2009/0193410 A1 | 7/2009 | Arthursson et al. |
| 2009/0216910 A1 | 8/2009 | Duchesneau |
| 2009/0259345 A1 | 10/2009 | Kato et al. |
| 2009/0260007 A1 | 10/2009 | Beaty et al. |
| 2009/0300210 A1 | 12/2009 | Ferris |
| 2010/0050172 A1 | 2/2010 | Ferris |
| 2010/0057913 A1 | 3/2010 | DeHaan |
| 2010/0106820 A1 | 4/2010 | Gulati et al. |
| 2010/0125845 A1 | 5/2010 | Sugumar et al. |
| 2010/0131324 A1 | 5/2010 | Ferris |
| 2010/0162259 A1 | 6/2010 | Koh et al. |
| 2010/0223383 A1 | 9/2010 | Salevan et al. |
| 2010/0223385 A1 | 9/2010 | Gulley et al. |
| 2010/0235632 A1 | 9/2010 | Iyengar et al. |
| 2010/0250744 A1 | 9/2010 | Hadad et al. |
| 2010/0262752 A1 | 10/2010 | Davis et al. |
| 2010/0299313 A1 | 11/2010 | Orsini et al. |
| 2010/0306765 A1 | 12/2010 | DeHaan |
| 2010/0306767 A1 | 12/2010 | Dehaan |
| 2010/0318609 A1 | 12/2010 | Lahiri et al. |
| 2010/0332629 A1 | 12/2010 | Cotugno et al. |
| 2010/0333087 A1 | 12/2010 | Vaidyanathan et al. |
| 2011/0016214 A1 | 1/2011 | Jackson |
| 2011/0029969 A1 | 2/2011 | Venkataraja et al. |
| 2011/0047315 A1 | 2/2011 | De Dinechin et al. |
| 2011/0055396 A1 | 3/2011 | Dehaan |
| 2011/0078303 A1 | 3/2011 | Li et al. |
| 2011/0107332 A1 | 5/2011 | Bash |
| 2011/0131306 A1 | 6/2011 | Ferris et al. |
| 2011/0131329 A1 | 6/2011 | Kaplinger et al. |
| 2011/0131589 A1 | 6/2011 | Beaty et al. |
| 2011/0138382 A1 | 6/2011 | Hauser et al. |
| 2011/0145392 A1 | 6/2011 | Dawson et al. |
| 2011/0153724 A1 | 6/2011 | Raja et al. |
| 2011/0161952 A1 | 6/2011 | Poddar et al. |
| 2011/0173470 A1 | 7/2011 | Tran |
| 2011/0179132 A1 | 7/2011 | Mayo et al. |
| 2011/0179134 A1 | 7/2011 | Mayo et al. |
| 2011/0179162 A1 | 7/2011 | Mayo et al. |
| 2011/0185063 A1 | 7/2011 | Head et al. |
| 2011/0219372 A1 | 9/2011 | Agrawal et al. |
| 2011/0270968 A1 | 11/2011 | Salsburg et al. |
| 2011/0276951 A1 | 11/2011 | Jain |
| 2011/0296021 A1 | 12/2011 | Dorai et al. |
| 2011/0320520 A1 | 12/2011 | Jain |
| 2012/0017210 A1 | 1/2012 | Huggins et al. |
| 2012/0066682 A1 | 3/2012 | Al-Aziz et al. |
| 2012/0131591 A1 | 5/2012 | Moorthi et al. |
| 2012/0167081 A1 | 6/2012 | Sedayao et al. |
| 2012/0173709 A1 | 7/2012 | Li et al. |
| 2012/0179874 A1 | 7/2012 | Chang et al. |
| 2012/0204176 A1 | 8/2012 | Tian et al. |
| 2012/0221845 A1 | 8/2012 | Ferris |
| 2012/0311012 A1 | 12/2012 | Mazhar et al. |
| 2013/0129068 A1 | 5/2013 | Lawson et al. |
| 2013/0132057 A1 | 5/2013 | Deng et al. |

OTHER PUBLICATIONS

Brendan Gregg; "Heat Map Analytics"; Mar. 17, 2009; Oracle; pp. 1-7; https://blogs.oracle.com/brendan/entry/heat_map_analytics.*

Robert; "There is more than one way to heat a map"; Feb. 10, 2009; Clearly and Simply; pp. 1-12; http://www.clearlyandsimply.com/clearly_and_simply/2009/02/there-is-more-than-one-way-to-heat-a-map.html.*

Yagoubi, Belabbas et al., "Load Balancing in Grid Computing," Asian Journal of Information Technology, vol. 5, No. 10 , pp. 1095-1103, 2006.

Kramer,"Advanced Message Queuing Protocol (AMQP)," Linux Journal, Nov. 2009, p. 1-3.

Subramoni et al., "Design and Evaluation of Benchmarks for Financial Applications Using Advanced Message Queuing Protocol (AMQP) over InfiniBand," Nov. 2008.

Richardson et al., "Introduction to RabbitMQ," Sep. 2008, p. 1-33.

Bernstein et al., "Using XMPP as a Transport in Intercloud Protocols," Jun. 22, 2010, p. 1-8.

Bernstein et al., "Blueprint for the Intercloud—Protocols and Formats for Cloud Computing Interoperabiilty," May 28, 2009, p. 328-336.

Bi et al. "Dynamic Provisioning Modeling for Virtualized Multi-tier Applications in Cloud Data Center". 2010 IEEE 3rd International Conference on Cloud Computing. pp. 370-377.

Chappell, David. "Introducing Windows Azure". Microsoft Corporation. Oct. 2010. pp. 1-25.

* cited by examiner

SYSTEMS, METHODS, AND MEDIA FOR GENERATING MULTIDIMENSIONAL HEAT MAPS

FIELD OF THE TECHNOLOGY

Embodiments of the disclosure relate to the management of computing resources. Systems, methods, and media provided herein may be utilized to generate multidimensional heat maps of performance values of computing resources, and in some embodiments, the performance of cloud-based computing resources.

BACKGROUND OF THE DISCLOSURE

A cloud is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™, or such systems may be accessible to outside users who deploy applications within the computing infrastructure to obtain the benefit of large computational or storage resources. The cloud may be formed, for example, by a network of servers with each server providing processor and/or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

SUMMARY OF THE DISCLOSURE

According to some embodiments, the present technology may be directed to methods for generating a heat map of event data by: (a) gathering instances of event data according to a performance characteristic; (b) decomposing the instances by applying at least one constraint to the instances; (c) assigning a hue to each instance, the hue being associated with the at least one constraint; and (d) generating a heat map that includes representations of the instances, wherein each representation includes the hue associated with the at least one constraint to which the instance has been assigned.

According to other embodiments, the present technology may be directed to systems for generating a heat map of event data. These systems may include: (a) a memory for storing an executable instructions that generate a heat map of event data; (b) a processor for executing the instructions; (c) a numerical decomposer that applies a performance characteristic to the instances of event data; (d) a discrete decomposer that applies at least one constraint to the instances; (e) an assignment module that assigns a hue to each instance, the hue being associated with the at least one constraint; and (f) a user interface module that generates a heat map that includes representations of the instances, wherein each representation includes the hue associated with the at least one constraint to which the instance has been assigned.

According to additional embodiments, the present technology may be directed to computer readable storage media for generating a heat map of event data. The method may include (a) receiving a request to generate a heat map, the request comprising parameters for selecting instances of event data for at least one computing resource; (b) numerically decomposing the instances of event data by applying a performance characteristic to the instances; (c) discretely decomposing the instances by applying at least one constraint to the instances; (d) assigning a hue to each instance, the hue being associated with the at least one constraint; and (e) generating a heat map that includes representations of the instances, wherein each representation includes the hue associated with the at least one constraint to which the instance has been assigned.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Figure 1:
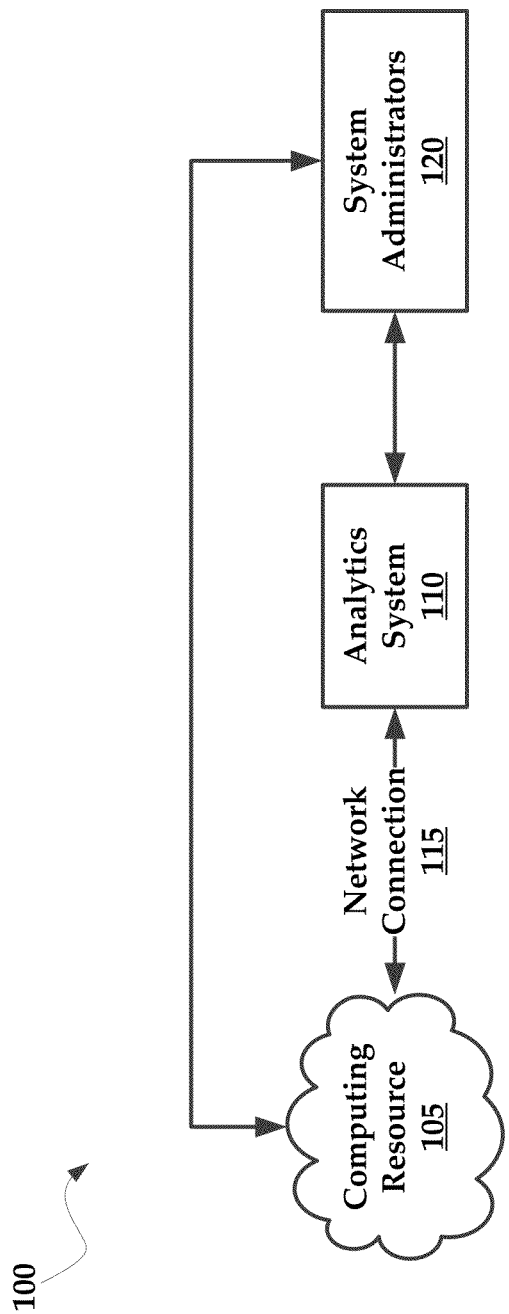

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Figure 2:
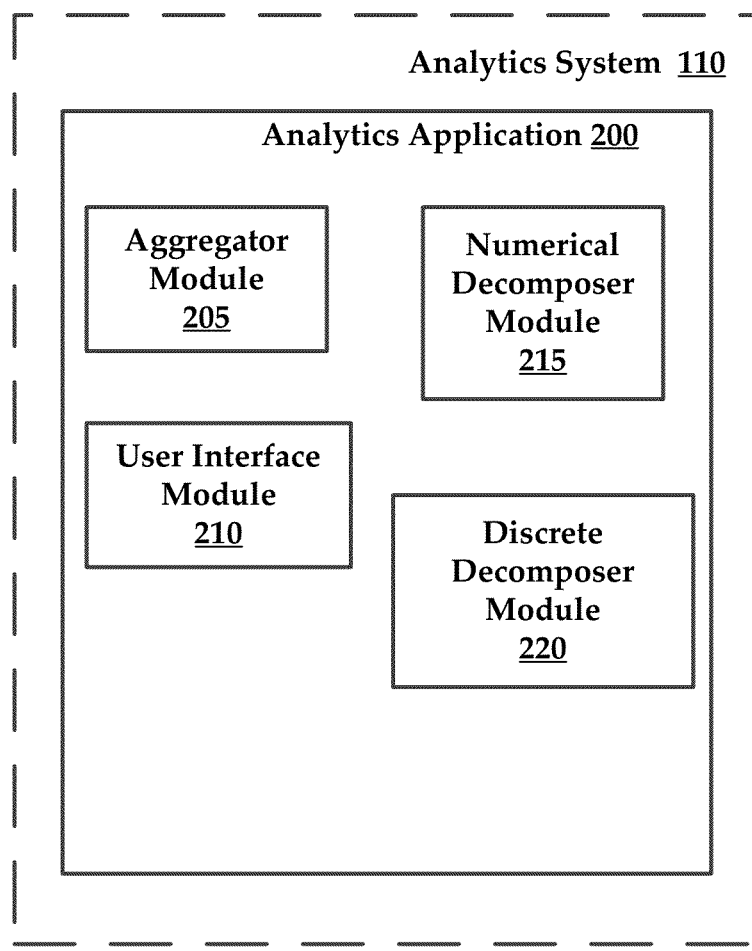
Figure 3:
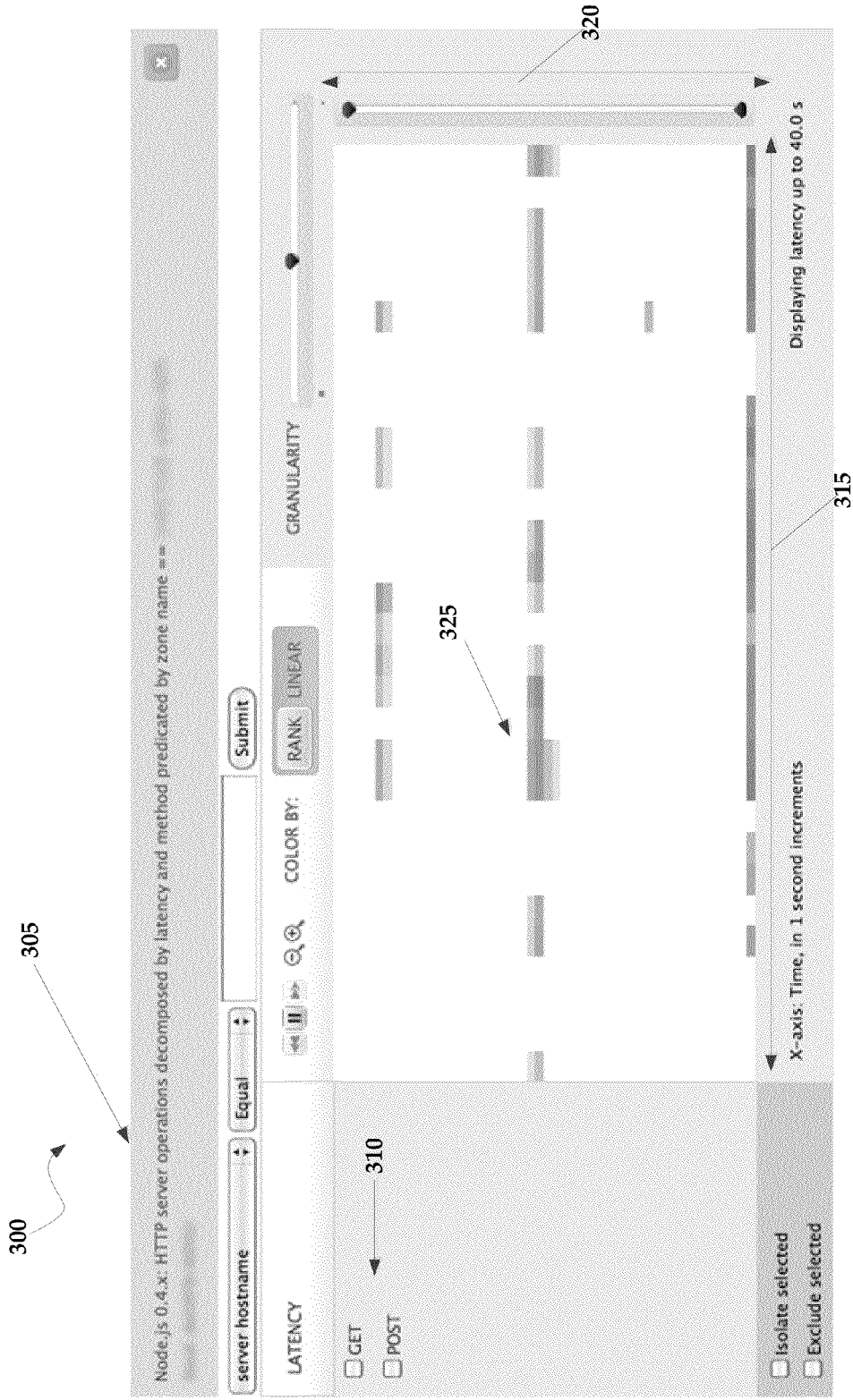
Figure 4:
Figure 5A:
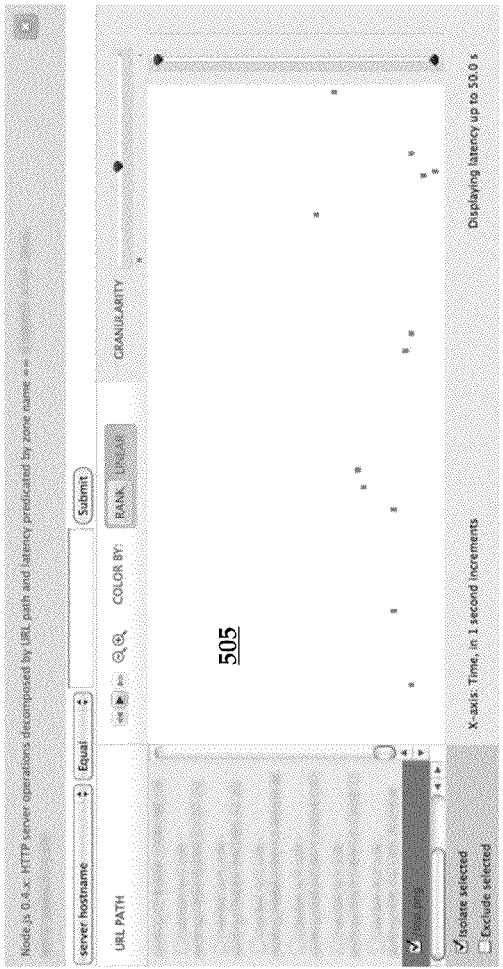
Figure 5B:
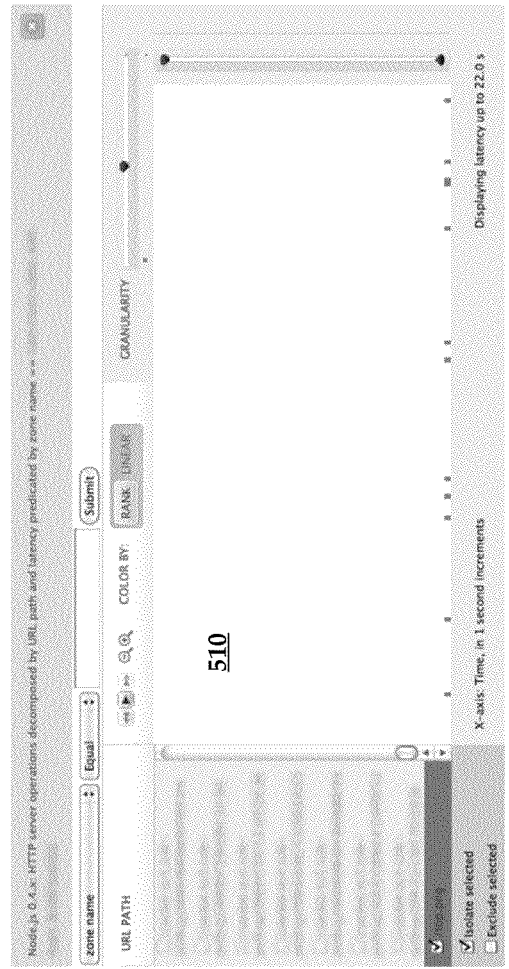
Figure 6:
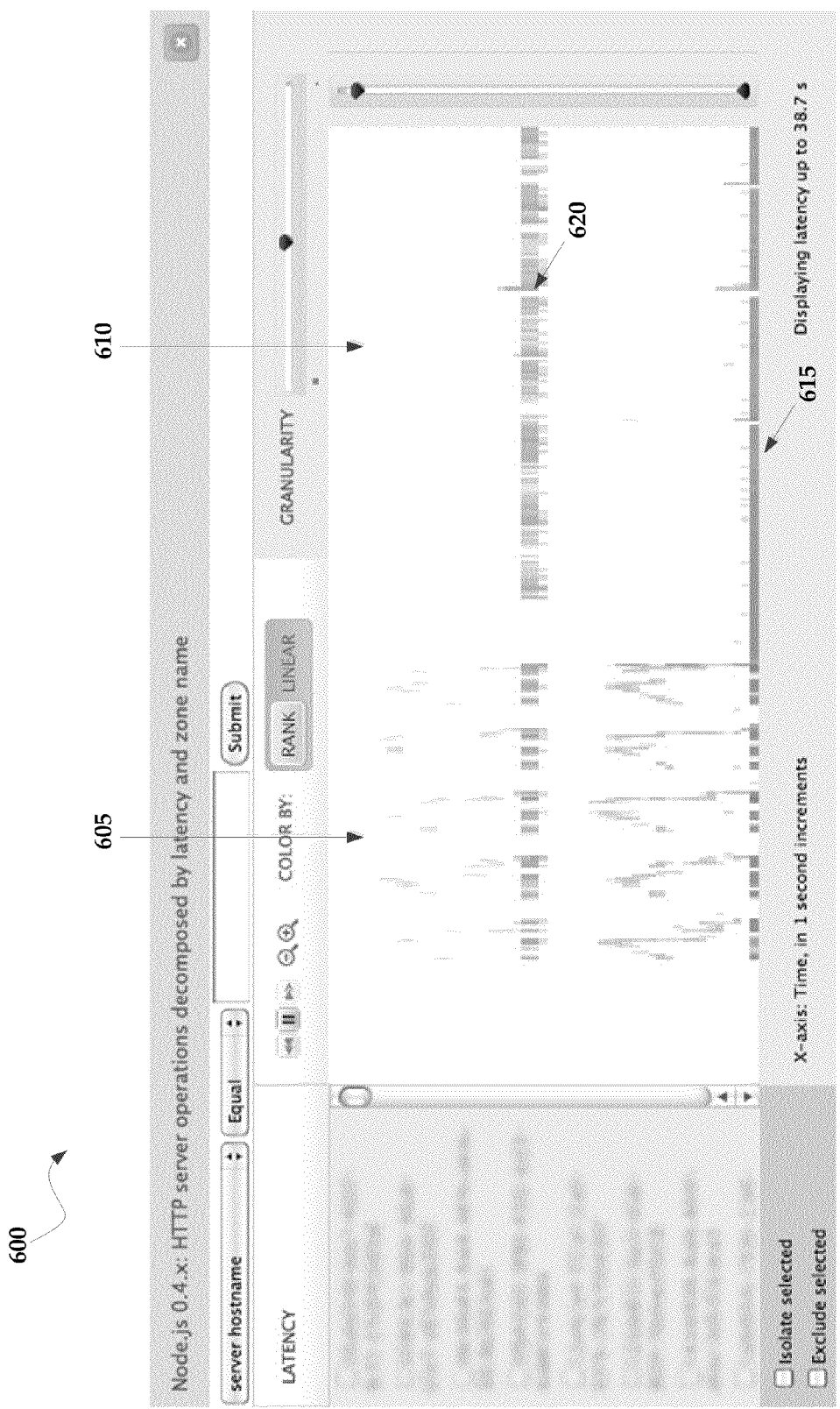
Figure 7:
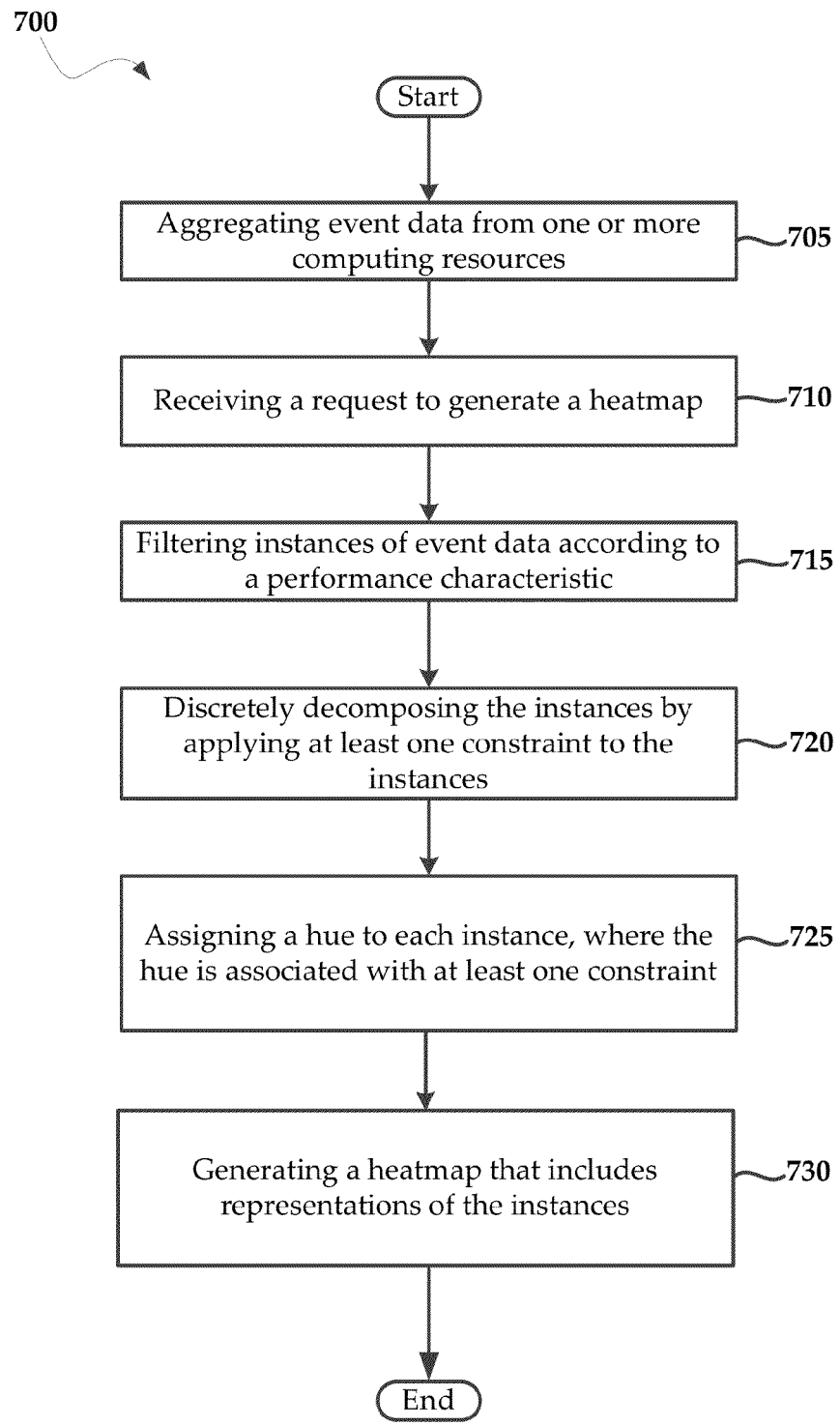
Figure 8:
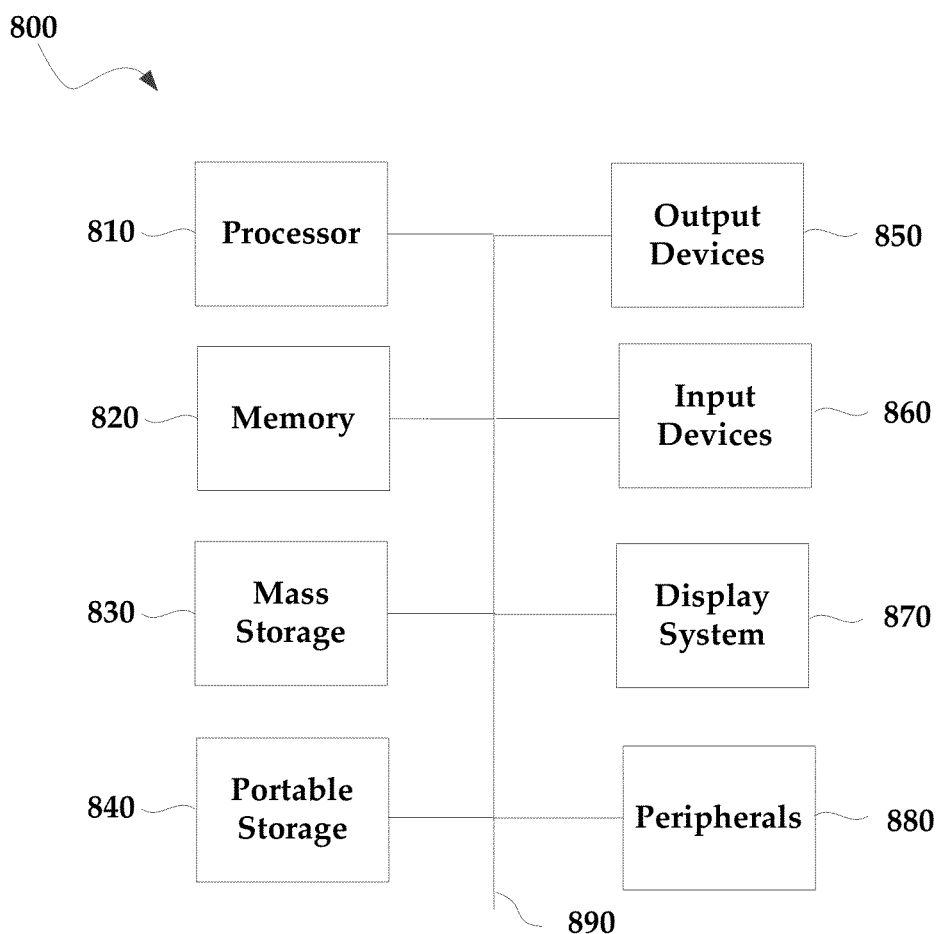

FIG. 1 illustrates an exemplary system for practicing aspects of the present technology;

FIG. 2 illustrates an exemplary analytics application for generating heat maps of event data;

FIG. 3 illustrates an exemplary three dimensional heat map;

FIG. 4 illustrates an exemplary four dimensional heat map of a computing resource with performance issues;

FIGS. 5A and 5B illustrate exemplary heat maps for discrete devices;

FIG. 6 illustrates an exemplary four dimensional heat map that represents both a computing resource with performance issues and the same computing resource having the performance issue resolved;

FIG. 7 is a flowchart of an exemplary method for generating heat maps of event data; and FIG. 8 illustrates an exemplary computing system that may be used to implement embodiments according to the present technology.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Generally speaking, the present technology is directed to generating heat maps from event data created by computing resources, and specifically to generating multidimensional heat maps. These heat maps may provide visual representations of event data that allow system administrators to determine and/or diagnose problems within the computing resources. For example, the heat map may allow a system administrator to determine why a particular program, such as a web-based application, is running slowly on a web server. In other instances heat maps may assist system administrators in analyzing many other types of objectively quantifiable information such as overall system utilization (for capacity planning). Heat maps may also be generated to answer business questions related to computing resource, for example, determining a quantity of a cloud's computing resources that are currently being used by a zone or a program within the cloud.

In some embodiments, heat maps may be generated that reflect the performance values of the cloud, or of any other computing resource. Additionally, heat maps may function as a visual representation of many performance values for a computing resource. The present technology generates multidimensional heat maps that provide unique visual representations of analytics of computing resources that may assist system administrators in optimizing the performance of computing resources. In some embodiments, the present technology may include cloud analytics within a browser-based interface that includes visualizations that assist administrators in detecting performance issues across the cloud, in real-time. Generally described, the heat maps may include a plurality of axes that represent different aspects of event data. For example, a heat map may include a first dimension represented by a horizontally oriented x-axis, a second dimension represented by a vertically oriented y-axis, a third dimension represented by a color saturation of a container (or an individual value), and a fourth dimension represented by a color hue. Heat maps may be generated from individual data points and may resemble scatter plots. These scatter plot heat maps may include similar dimensions to heat maps that include containers where a first dimension is represented by a horizontally oriented x-axis, a second dimension may be represented by a vertically oriented y-axis, and a third dimension is shown by visually differentiating the instance points, such as by color hue.

The terms performance values may be understood to include not only performance based metrics such as latency, bandwidth, and so forth, but also other types of metrics. Similarly, heat maps may be generated based upon other metrics beyond performance based metrics. For example, a heat map may be generated that illustrates the amount of memory installed on a plurality of servers within a cloud. In another instance, a heat map may be generated to illustrate a number of hardware faults within a computing resource (e.g., correctable ECC "Error Correction Codes" errors)

The present technology may discretely decompose event data generated by computing resources, and particularly cloud-based computing resources that may run pluralities of programs, instances of programs, handle pluralities of requests for resources per second, or other complex computing tasks that generate event data.

An instance of event data may be understood to comprise any combination of information that corresponds to an instance of computing activity, such as a single (or multiple) measurable actions. For example, an instance of event data may include descriptive information such as identifying information that indicates a computing device that executes a program, a program and/or module that instantiates an action, a latency of an action, or any other measurable computing activity that is quantifiable in terms of magnitude, time, and so forth.

The present technology may generate heat maps from event data, or summaries of event data. These heat maps may include collections and presentations of n-dimensions of data. In some embodiments the heat maps may include scatter plots that comprise individual instances of event data that are arranged along a first axis of the heat map according to a time associated with the event and along a second axis according to a performance characteristic associated with the event. Each instance may include a mechanism for visual differentiation, such as color hue, that represents a constraint associated with a discrete decomposition. That is, each instance may be assigned a constraint that represents a discrete object that may be associated with the instance. For example, a constraint may include an indication of the computing resource (e.g., discrete resource) that generated a search request. As such, URLs handled by cache memory may be attributed to another computing resource and may be assigned a different constraint. Instances of event data may be differentiated from one another (or alternative grouped together) if they are associated with a different constraint relative to one another.

Overlapping instances with different hues may combine to form different hues. For example, instances of event data generated by a first computing resource may be associated with a blue hue, and instances of event data associated with a second computing resource may be associated with a yellow hue. When these two instances of event data share a common event time and a common performance value, they may overlap one another to form a green hue.

In other embodiments, instances of event data may be placed into containers. The heat map may then include representations of the containers, rather than individual data points. Containers allow the heat maps to be generated for data sets that are dense, allowing for scalability relative to the amount of event data. These and other advantages of the present technology will be described in greater detail with reference to the collective FIGS. 1-4.

FIG. 1 illustrates an exemplary system 100 for practicing aspects of the present technology. The system 100 may include a computing resource 105 that may include a cloud-based computing environment. As stated above, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In other embodiments, the computing resource 105 may include a distributed group of computing devices such as web servers that do not share computing resources or workload. Additionally, the computing resource 105 may include a single computing device that has been provisioned with a plurality of programs that each produce instances of event data.

The computing resource 105 may communicatively couple with an analytics system 110 via a network connection 115. The network connection 115 may include any one of a number of private and public communications mediums such as the Internet.

The analytics system 110 will be described in greater detail with regard to FIG. 2, but generally speaking, the analytics system 110 may generate heat maps of event data by discrete decomposition of instances of event data generated by the computing resource 105. The analytics system 110 may generate a heat map by gathering instances of event data according to a performance characteristic, discretely decomposing the instances by applying at least one constraint to the instances, assigning a hue to each instance, the hue being associated with the at least one constraint, and generating a heat map that includes representations of the instances, wherein each representation includes the hue associated with the at least one constraint to which the instance has been assigned. The term "gathering" may be understood to comprise any of a number of actions such as selecting, choosing, grouping, collecting, and so forth, along with other types of actions that would be known to one of ordinary skill the art with the present disclosure before them. For instance, in some embodiments, in a non-limiting example, the term "gathering" may mean aggregating and filtering.

System administrators 120 may utilize client computing devices to access both the computing resource 105 and the analytics system 110 via another network connection. The system administrators 120 may access the analytics system 110 via graphical user interfaces generated by the analytics system 110, as will be described in greater detail below.

FIG. 2 illustrates an analytics application, hereinafter referred to as application 200, which generally includes an aggregator module 205, a user interface module 210, a numerical decomposer module 215, and a discrete decomposer module 220. It is noteworthy that the application 200 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the application 200 may include separately configured web servers. Also, the application 200 may be provisioned with a cloud.

Prior to generating a heat map from instances of event data, an aggregator module 205 may be executed to obtain instances of event data (or summaries of event data) from the computing resource 105. In other instances event data is continually provided to the application 200 such that the aggregator module 205 does not have to obtain instances of data events proactively. It will be understood that the application 200 may utilize a plurality of aggregator modules to obtain instances of event data that may be utilized to generate heat maps. Such heat maps may represent the computing activities of the computing resource 105 such as aggregate URL responses by module (e.g., cached, searched, etc.) or certain performance aspects of the computing resource or a computing activity, such as latency, bandwidth, workload, and so forth.

Once data has been aggregated by the aggregator module 205, the user interface module 210 generates a user interface that allows the end user to specify parameters that may be utilized to generate a heat map. For example, parameters may include an instrumentality that is to be measured. Non-limiting examples of instrumentalities may include HTTP requests, CPU threads, filesystem operations, and the like. Rather than aggregating all event data associated with an instrumentality, an end user may also specify one or more aspects for which they would like to aggregate data. For example, if an end user desires to review HTTP requests for only "search" (e.g., HTTP requests that could not be fulfilled via a response stored in cache memory) the end user may specify that an aggregator should obtain event data from the web server that performs search requests.

It will be understood that one of the many parameters that may be established includes determining a performance characteristic for an instance of event data. For example, an HTTP request processed by the search server may have a latency value (e.g. performance value) of 200 milliseconds. Latency may be understood to define a timespan that was required to fulfill a particular computing action, which in this case includes the timespan required to perform the HTTP request that included a search for the resource, rather than a return of a cached response. As would be understood by one of ordinary skill in the art, latency may include other performance characteristics for a computing event such as a timespan required to transmit a file from a first location to a second location, a timespan required to perform a calculation, a timespan required to launch a program or a module, and so forth.

Once the parameters have been established, the numerical decomposer module 215 may be executed to numerically decompose instances (or summaries) of event data gather by the aggregator module 205 by applying the selected performance characteristic to the instances of events of event data. That is, the numerical decomposer module 215 may process the instances of event data according to the performance characteristic defined by the end user. The processing of the instances of event data using the performance characteristic allows the instances of event data to be plotted on a three dimensional heat map, such as the heat map of FIG. 3, which will be described in greater detail infra.

Before plotting the instances of event data to the heat map, the instances may be placed into containers via the aggregator module 205. That is, a heat map may be provisioned into a plurality of containers. Each of the containers may include a range of values. For example, a latency heat map may include containers that include a range of latency values. A container may include latency values from zero to 100 milliseconds, another container may include latency values from 100 to 200 milliseconds, and so forth. An instance of event data may be placed into a container by comparing a value for the performance characteristic to the containers. Instances of computing events that had a latency value of 50 milliseconds would be placed into the zero to 100 millisecond container. Additionally, each of the containers may be associated with a temporal aspect. That is, only instances of event data that have a particular latency value and occurred within a specified timespan may be placed into the container.

The number of containers created for the heat map may be as granular as individual data points, or may be scaled to include any number of instances of computing events. In fact, the heat map may include a scatter plot of individual data points that represent instances of event data.

Also, in some instances, the containers may include overlapping value ranges such that some instances of event data may be properly categorized as belonging to multiple containers. In such cases, the event data may be weighted and portioned to each of the multiple containers according to the weighting.

Once the event data has been placed into containers, the containers may be plotted on the heat map, as described below.

FIG. 3 illustrates an exemplary three-dimensional heat map 300 for HTTP request latency for a web server. It will be understood that the heat map 300 may be generated by the user interface module 210.

The selected instrumentality for the heat map 300 includes HTTP server operations 305. The HTTP server operations 305 is shown as having aspects 310, which include /GET and /POST. It is noteworthy to mention that containers which include individual instances of event data associated with all URL paths are being shown.

The heat map includes a first axis 315 that extends horizontally along the length of the heat map 300. The first axis 315 may be segmented into event time, and the event time may correspond to the width of a block that represents a container. In this example, the first axis 315 represents the passage of time (e.g., a chronological timeline).

The second axis 320 may comprise a range of latency values, such that higher vertical positioning on the second axis 320 indicates greater latency.

Because the containers have both a temporal aspect and a performance value range, the containers may be plotted along the first and second axes. For example, blocks 325 may be arranged onto the heat map 300 along the first axis 315 and also along the second axis 320 in a vertical manner.

In addition to positioning of containers within the heat map 300, color saturation may be applied to each container. The color saturation may represent an aggregate number of instances of event data that are included in a particular container. The darker the block, the greater the number of instances included in the container. The attribution of color saturation to a container may be referred to as a third dimension of the heat map 300.

Therefore, from a visual inspection of the heat map 300, a system administrator may determine that certain instances of event data fall outside acceptable ranges for latency. While such information may indeed be valuable, additional dimensional metrics may be applied to the heat map 300 to assist the system administrator in deducing the actual cause of any latency issues. That is, the inclusion of additional restraints or heat maps with additional dimensional data may further elucidate latency issues.

While not shown, selection of individual pixels or containers may display a variety of event data associated therewith, such as specific event times, specific latency values, functions, component identification, or other information associated with the event. In this example, it is understood that clicking on the containers within a line with the lowest latency values shows that the events associated with the lowest latency are generated by synchronous website components, while containers having greater latency appear to be associated with asynchronous polling.

Referring back to FIG. 2, in some embodiments, the discrete decomposer module 220 may be executed to further decompose the data within the containers. The discrete decomposer module 220 may apply additional constraints to the instances of event data included in the containers. The additional constraints may filter the instances of event data that were generated by discrete computing entities, such as network nodes (which may be implemented as operating system "zones") that handle HTTP requests. The inclusion of an additional or fourth dimension of data is described in greater detail with regard to FIG. 4.

FIG. 4 illustrates an exemplary heat map 400 that includes four different dimensions for viewing instances of event data. The first and second dimensions remain the same, relative to time and latency. Also, the saturation dimension remains.

To further differentiate instances of event data, the containers associated with a first zone are shown in blue and containers associated with a second zone are shown in yellow. It is noteworthy to mention that the first zone contains a web server which can only be accessed via the second zone, which contains a web proxy.

The blue containers illustrate that a certain portions of HTTP requests generated by the first zone have low latency, as evidenced by the containers located approximately along a line 405. Another portion of HTTP requests generated by the first zone have relative higher latency, as illustrated by containers along a line 410.

Latency for HTTP requests served by the second zone follow two substantially triangular patterns 415 and 420. The first pattern 415 indicates that most of the HTTP requests processed by the second zone are subject to variable but relatively short latency as compared to triangular pattern 420 which indicates fewer instances of event data, but with higher latency. Triangular patterns 415 and 420 appear to mimic one another in shape.

While not shown, additional heat maps may be generated that describe latency for other computing resources such as file system latency, I/O latency, or other types of latency related analyses that help the system administrator focus their attention on underperforming resources and remedy the same.

It can be inferred from a visual inspection of the heat map 400 that the proxy server is the source of the latency issues relative to HTTP requests. In fact, latency values may be determined even down to a content level.

FIGS. 5A and 5B illustrate additional heat maps 505 and 510, respectively. Upon reviewing the heat map 400, the discrete decomposer module 220 may be utilized to apply additional constraints upon the event data which would impose a fifth dimension to the display of the event data. In this example, the heat map 505 may include HTTP request information for the web proxy component that is filtered for requests for a specific type of content. Heat map 510 may include HTTP request information for the backend server that is filtered for requests for the same specific type of content. By comparing the latencies of both the components relative to how each zone provides a particular resource, such as an image file, the latency issues can be attributed to the web proxy. That is, the latencies of the web proxy are much greater than the latencies of the backend server (e.g., originating web server).

FIG. 6 illustrates yet another heat map 600 that shows an improvement in latency for the computing resource. That is, once the problem with the web proxy has been discovered and remedied, an additional heat map 600 may be generated that shows the improvement in latency. Heat map 600 includes both the heat map information for FIG. 4 in section 605 and a section 610 that illustrates the matched latencies of the zones as lines 615 and 620. As is shown, the triangular pattern associated with zone two has almost entirely disappeared.

As described previously, the containers of the two resources overlap one another to create a unique hue, and in this case is a combination of yellow and blue, which combine to create green. Non-overlapping containers are shown as blue and yellow. Saturation also remains.

FIG. 7 illustrates a flowchart of an exemplary method 700 for generating heat maps from event data. The method may include a step 705 of aggregating event data from one or more computing resources. Next, the method may include a step 710 of receiving a request to generate a heat map. It will be understood that the request may comprise parameters for selecting instances of event data for at least one computing resource.

Next, the method may include a step 715 of filtering instances of event data according to a performance characteristic. As stated above, a performance characteristic may include latency, bandwidth, workload, file offset, device offset, I/O size, sub-second offset, or any other measurable computing resource quantity that would be known to one of ordinary skill in the art. Numerical decomposition of event data by applying the performance characteristic adds a third dimension to the eventual display of the event data.

The method may also include a step 720 of discretely decomposing the instances by applying at least one constraint to the instances. Again, the constraint may include the selection of a component, a device, or other discrete computing object such as a proxy, a module, a server, and the like. Discrete decomposition of event data by applying the at least one constraint adds a fourth dimension to the eventual display of the event data.

The method may include a step 725 of assigning a hue to each instance, where the hue is associated with the at least one constraint. That is, an instance of event data may be associated with a color hue based upon the constraint that has been placed upon the instance of event data. Event data generated by a particular computing object, such as a web server that processes HTTP requests, may be colored similarly, while event data generated by another computing object, such as a cache memory module that also processes HTTP requests may be colored with a different color relative to those generated by the web server.

It will be understood that in some embodiments, wherein rather than assigning a hue, the method may include assigning a visualization. The visualization may include a pattern. A pattern may be understood to include individual dots or pixels of color (even potentially black and white) that are arranged in a predetermined manner. Exemplary patterns may include geometrical shapes, irregular shapes, or even arbitrary shapes.

Additionally, the method may include a step 730 of generating a heat map that includes representations of the instances, wherein each representation includes the hue associated with the at least one constraint to which the instance has been assigned. Additional constraints may be applied to the instances of event data to add additional dimensions thereto. It will be understood that in some instances, when a constraint is applied to the event data, the amount of event data may be reduced. These functionalities may be referred to as "isolation" or "exclusion" functions. Isolation functions generally isolate a particular aspect and exclusion functions remove a selected aspect from a heat map. That is, the application of constraints to the event data may act as filters that remove certain portions of the event data from inclusion into a heat map. It will be understood that in some embodiments, the method may include additional or fewer steps from those recited herein.

FIG. 8 illustrates an exemplary computing device 800 that may be used to implement an embodiment of the present technology. The computing device 800 of FIG. 8 may be implemented in the contexts of the likes of computing resource or device 105 (FIG. 1). The computing device 800 of FIG. 8 includes one or more processors 810 and main memory 820. Main memory 820 stores, in part, instructions and data for execution by processor 810. Main memory 820 may store the executable code when in operation. The computing device 800 of FIG. 8 further includes a mass storage device 830, portable storage device 840, output devices 850, user input devices 860, a graphics display 870, and peripheral devices 880.

The components shown in FIG. 8 are depicted as being connected via a single bus 890. The components may be connected through one or more data transport means. Processor unit 810 and main memory 820 may be connected via a local microprocessor bus, and the mass storage device 830, peripheral device(s) 880, portable storage device 840, and graphics display 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 may store the system software for implementing embodiments of the present invention for purposes of loading that software into main memory 820.

Portable storage device 840 operates in conjunction with a portable non-volatile storage medium, such as a floppy disk, compact disk, digital video disc, or USB storage device, to input and output data and code to and from the computing device 800 of FIG. 8. The system software for implementing embodiments of the present invention may be stored on such a portable medium and input to the computing device 800 via the portable storage device 840.

Input devices 860 provide a portion of a user interface. Input devices 860 may include an alphanumeric keypad, such as a keyboard, for inputting alpha-numeric and other information, or a pointing device, such as a mouse, a trackball, stylus, or cursor direction keys. Additionally, the computing device 800 as shown in FIG. 8 includes output devices 850. Suitable output devices include speakers, printers, network interfaces, and monitors.

Graphics display 870 may include a liquid crystal display (LCD) or other suitable display device. Graphics display 870 receives textual and graphical information, and processes the information for output to the display device.

Peripherals 880 may include any type of computer support device to add additional functionality to the computer system. Peripheral device(s) 880 may include a modem or a router.

The components provided in the computing device 800 of FIG. 8 are those typically found in computer systems that may be suitable for use with embodiments of the present invention and are intended to represent a broad category of such computer components that are well known in the art. Thus, the computing device 800 of FIG. 8 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for generating a heat map of event data, the method comprising:
   executing instructions stored in memory via a processor of a computing system for:
      gathering instances of event data according to a first performance characteristic;
      establishing a first and second axis of the heat map, the first axis representing a parameter and the second axis representing the first performance characteristic of the event data;
      establishing a third and fourth axis of the heat map, the third axis represented using hue and the fourth axis represented using saturation;
      decomposing the instances of event data by applying at least one constraint to the instances, the at least one constraint comprising a selection of a discrete computing object;
      assigning a hue from the third axis to each instance of event data, the assigned hue being associated with the at least one constraint;
      determining a saturation for each instance of the event data for representation of the instance of the event data in the fourth axis, the saturation being associated with a second performance characteristic; and
      generating a heat map that includes representations of the instances of the event data in the first and second axis, wherein each representation further includes the hue assigned from the third axis and associated with the at least one constraint to which the hue for the instance of the event data has been assigned, and includes the determined saturation for representing the second performance characteristic for the instance of the event data in the fourth axis.

2. The method according to claim 1, wherein the first axis is a chronological timeline, and the second axis includes range of performance characteristic values.

3. The method according to claim 2, further comprising plotting the instances of the event data on the heat map along the second axis based upon a magnitude of the first performance characteristic for each instance.

4. The method according to claim 3, further comprising modifying the hue of an instance based upon an addition of another constraint to the instance.

5. The method according to claim 1, further comprising:
   comparing the magnitude of the second performance characteristic of an instance to a plurality of value ranges, wherein each value range is associated with a container; and
   placing the magnitude of the instance into one or more containers based upon the comparison, wherein the determined saturation represents a container into which a magnitude has been placed.

6. The method according to claim 5, wherein when an instance of event data includes a value that is shared between multiple containers, the instance of event data may be weighted and a portion of the instance of event data may be placed into each of the multiple containers based upon the weighting.

7. The method according to claim 1, wherein the first performance characteristic includes any of latency, bandwidth, utilization, file offset, device offset, I/O size, sub-second offset, content, and combinations thereof.

8. The method according to claim 1, further comprising receiving a request to generate a heat map, the request comprising parameters for selecting instances of event data for at least one computing resource.

9. The method according to claim 1, wherein rather than assigning a hue, the method includes assigning a visualization, wherein the visualization includes a pattern.

10. A system for generating a heat map of event data for a computing resource, the system comprising:
   a memory for storing an executable instructions that generate a heat map of event data, the heat map including a first axis and a second axis;
   a processor that executes the instructions;
   a numerical decomposer that filters the instances of event data according to a performance characteristic;
   a discrete decomposer that applies at least one constraint to the instances, the at least one constraint comprising a selection of a discrete computing object;
   an assignment module that assigns a hue to each instance, the hue being associated with the at least one constraint; and
   a user interface module that generates a heat map that includes representations of the instances, each representation including the hue associated with the at least one constraint to which the instance has been assigned
   an aggregator module that:
      compares a magnitude of event data for instances of event data to a plurality of value ranges, wherein each value range is associated with a container, further wherein each container includes a time span,
      places the event data into one or more containers based upon the comparison and a time span associated with the event data;
   wherein when an instance of event data includes a value that is shared between multiple containers, the aggregator module weights the instance and divides a portion of the instance of performance data into each of the multiple containers based upon the weight of the instance; and
   wherein the heat map comprises a third axis and a fourth axis, wherein the third axis is represented by color saturation and the fourth axis is represented by color hue.

11. The system according to claim 10, wherein the first axis is a chronological timeline, and the second axis includes range of performance characteristic values.

12. The system according to claim 11, wherein the user interface module plots the instances on the heat map along the second axis based upon a magnitude of the performance characteristic for each instance.

13. The system according to claim 12, wherein the user interface module modifies the hue of a plotted instance when the instance overlaps another instance having a different color, wherein modifying includes combining the hues of the instances together to form a unique hue.

14. The system according to claim 10, wherein user interface module plots a container onto a heat map based upon the magnitude of event data included in the container and the time span of the container.

15. The system according to claim 10, wherein the discrete decomposer applies n-constraints to the instances to generate n-dimensions that are used to generate additional heat maps for the instances of event data.

16. The system according to claim 10, wherein the performance characteristic includes any of latency, bandwidth, utilization, file offset, device offset, I/O size, sub-second offset, and combinations thereof.

17. A non-transitory computer readable storage media having a program embodied thereon, the program being executable by a processor to perform a method for generating a heat map of event data, the method comprising:

receiving a request to generate a heat map, the request comprising parameters for selecting instances of event data for at least one computing resource;

numerically decomposing the instances of event data by applying a performance characteristic to the instances;

discretely decomposing the instances by applying at least one constraint to the instances, the at least one constraint comprising a selection of a discrete computing object;

assigning a hue to each instance, the hue being associated with the at least one constraint; and generating a heat map that includes representations of the instances in four axes, wherein each axis representation includes:
  a position in a first and second axis of the heat map based on a parameter and the performance characteristic,
  the hue associated with the at least one constraint to which the instance has been assigned, and
  a saturation based on another performance characteristic.

18. The system according to claim 17, wherein the another performance characteristic includes any of number of occurrences, latency, bandwidth, utilization, file offset, device offset, I/O size, sub-second offset, and combinations thereof.

19. The method according to claim 1, further comprising assigning a visualization representing a third performance characteristic, wherein the visualization includes a pattern for representation of the third performance characteristic in a fifth axis.

20. The method according to claim 10, wherein the heat map comprises a fifth axis represented by patterns including individual dots arranged in a predetermined manner, pixels of color arranged in a predetermined manner, geometrical shapes, and combinations thereof.

21. The system according to claim 1, wherein the second performance characteristic includes any of number of occurrences, latency, bandwidth, utilization, file offset, device offset, I/O size, sub-second offset, and combinations thereof.

* * * * *